US009509387B2

(12) United States Patent
Athley et al.

(10) Patent No.: US 9,509,387 B2
(45) Date of Patent: Nov. 29, 2016

(54) NODE IN A WIRELESS COMMUNICATION SYSTEM WHERE ANTENNA BEAMS MATCH THE SECTOR WIDTH

(71) Applicant: TELEFONAKTIEBOLAGET L M ERICSSON (PUBL), Stockholm (SE)

(72) Inventors: Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/896,529

(22) PCT Filed: Jun. 24, 2013

(86) PCT No.: PCT/EP2013/063164
§ 371 (c)(1),
(2) Date: Dec. 7, 2015

(87) PCT Pub. No.: WO2014/206443
PCT Pub. Date: Dec. 31, 2014

(65) Prior Publication Data
US 2016/0127023 A1    May 5, 2016

(51) Int. Cl.
| | | |
|---|---|---|
| H04B 7/02 | (2006.01) |
| H04B 7/06 | (2006.01) |
| H01Q 1/24 | (2006.01) |
| H04B 7/04 | (2006.01) |
| H01Q 3/26 | (2006.01) |
| H01Q 3/40 | (2006.01) |

(52) U.S. Cl.
CPC ............ *H04B 7/0617* (2013.01); *H01Q 1/246* (2013.01); *H01Q 3/26* (2013.01); *H01Q 3/40* (2013.01); *H04B 7/0456* (2013.01); *H04B 7/0691* (2013.01)

(58) Field of Classification Search
CPC .. H04B 7/0617; H04B 7/043; H04B 7/0408; H04B 7/10; H04B 7/0413; H04B 7/04; H04W 52/42; G01S 13/4463

USPC ............... 375/267, 260, 219; 455/101, 500; 342/368, 373, 343; 343/893
See application file for complete search history.

(56) References Cited

U.S. PATENT DOCUMENTS

| | | | |
|---|---|---|---|
| 2007/0159407 A1 | 7/2007 | Bolle et al. | |
| 2011/0122026 A1 | 5/2011 | Delaquil et al. | |
| 2014/0362732 A1* | 12/2014 | Landstrom .......... | H04L 25/0226 370/254 |

FOREIGN PATENT DOCUMENTS

| | | |
|---|---|---|
| WO | 2011103918 A1 | 9/2011 |
| WO | 2013087091 A1 | 6/2013 |

OTHER PUBLICATIONS

International Search Report and Written Opinion dated Feb. 21, 2014, in International Application No. PCT/EP2013/063164, 10 pages.

*Primary Examiner* — Rahel Guarino
(74) *Attorney, Agent, or Firm* — Rothwell, Figg, Ernst & Manbeck, P.C.

(57) ABSTRACT

The present invention relates to a node in a wireless communication system (W), the node comprises an antenna arrangement with at least three physical antenna elements and a first beam-forming network. Each physical antenna element has a corresponding physical phase center and antenna port. The physical phase centers are separated by corresponding physical distances, and the physical antenna ports are connected to the first beam-forming network. The first beam-forming network is arranged to transform the physical antenna ports to at least two virtual antenna ports which correspond to virtual antenna elements. Each virtual antenna element has a certain virtual phase center where the virtual phase centers are separated by corresponding virtual distances, where the physical distances differ from the virtual distances. The present invention also relates to a corresponding method.

11 Claims, 4 Drawing Sheets

NODE IN A WIRELESS COMMUNICATION SYSTEM WHERE ANTENNA BEAMS MATCH THE SECTOR WIDTH

CROSS REFERENCE TO RELATED APPLICATION(S)

This application is a 35 U.S.C. §371 National Phase Entry Application from PCT/EP2013/063164, filed Jun. 24, 2013, designating the United States, the disclosure of which is incorporated herein in its entirety by reference.

TECHNICAL FIELD

The present invention relates to a node in a wireless communication system. The node comprises an antenna arrangement with at least three physical antenna elements and a first beam-forming network. Each physical antenna element has a corresponding physical phase center and corresponding antenna port. The physical phase centers are separated by corresponding physical distances, and the physical antenna ports are connected to the first beam-forming network.

The present invention also relates to a method for enhancing efficiency of antenna beams at a node in a wireless communication system.

BACKGROUND

In current wireless communication systems such as LTE (Long Term Evolution) and HSPA (High Speed Packet Access), multi-antenna systems are used to increase capacity, coverage, and link reliability. At the base station, antenna arrays are used to create two types of beams.

Type one relates to beams for sector coverage where control and system information are transmitted, e.g., BCH (broadcast channel) and CRS (cell-specific reference signal) in LTE. Since these signals need to reach all users in a cell, they have to be transmitted with a sufficiently wide beam that covers the desired area. The beam should also be sufficiently narrow in order not to transmit too much interference into neighboring sectors. Typically, a beam with 65° half-power beamwidth (HPBW) is used for 3-sector sites, since this provides a good balance between the two conflicting requirements mentioned previously.

Type two relates to beams for user-specific data transmission, e.g., PDSCH (physical downlink shared channel) in LTE. These beams should be narrow in order to maximize the gain to the intended user and also to minimize the interference transmitted to other users.

With a traditional base station antenna, sector coverage is typically provided by a column of radiating elements connected via a feed network to a physical antenna port. The azimuth radiating pattern of the sector-covering beam is in this case given by the individual radiating element. Several such columns can then be assembled adjacent to each other to form an antenna array in the horizontal dimension. By applying beamforming weights to this array, user-specific beams can be created. In LTE, several transmission modes have been specified that make use of user-specific beamforming. One example is transmission mode 4 (TM4) where beamforming weights are selected from a set of predefined weights in a codebook, so called codebook-based precoding.

Active antenna arrays may also be used, in which each radiating element, or a group of radiating elements, is equipped with its own radio branch. With active antenna arrays, the generation of sector-covering beams becomes more flexible since these beams can be created from several radiating elements by means of beamforming. A sector-covering beam is then associated with a so called virtual antenna port. User-specific beamforming is performed by applying weights to a plurality of such virtual antenna ports.

The flexibility in the sector beam generation can be utilized for sector shape reconfiguration when changes occur in the network such as changes in deployment or spatial traffic distribution, e.g., new sites, buildings, or traffic hotspots. It is well known that such reconfiguration can give substantial improvements in system performance.

An effective means for sector shape reconfiguration is to change the azimuth beamwidth of the sector covering beam, thereby changing the width of the sector. A resulting problem with this is that the beams in the predefined codebook are not suited for the new sector width. Both the beamwidth and pointing directions of these beams may be poorly matched to the sector width. For example, a codebook beam pointing inside the sector before reconfiguration may point outside the sector after reconfiguration. With the original sector beam pattern, before reconfiguration, all user-specific beams point within the sector. After a reconfiguration that has made the sector narrower, some of the user-specific beams point outside the new narrow sector.

This means that when changing the sector width in wireless cellular networks by means of reconfigurable antennas, the angular coverage of the precoder beams in a predetermined codebook (such as in LTE) may become poorly matched to the new sector width. This can result in high interference and reduced coverage of precoded user data.

It is therefore a desire to provide a node in a wireless communication system that comprises an antenna arrangement that enables changing of the sector width in wireless cellular networks, where all beams are matched to the new sector width.

SUMMARY

It is an object of the present invention to provide a node in a wireless communication system, where the node has an antenna arrangement that enables changing of the sector width in wireless cellular networks where all beams are matched to the new sector width.

Said object is obtained by means of a node in a wireless communication system. The node comprises an antenna arrangement with at least three physical antenna elements and a first beam-forming network. Each physical antenna element has a corresponding physical phase center and corresponding antenna port. The physical phase centers are separated by corresponding physical distances, and the physical antenna ports are connected to the first beam-forming network. The first beam-forming network is arranged to transform said physical antenna ports to at least two virtual antenna ports which correspond to virtual antenna elements. Each virtual antenna element has a certain virtual phase center where the virtual phase centers are separated by corresponding virtual distances, where the physical distances differ from the virtual distances.

Said object is also obtained by means of a method for enhancing efficiency of antenna beams at a node in a wireless communication system. The method comprises the steps of:

transforming physical distances between physical phase centers of physical antenna elements to virtual distances between virtual phase centers of virtual antenna elements; and using the virtual antenna elements, with said virtual distances between their corresponding virtual phase centers, for beamforming.

According to an example, the antenna arrangement comprises a second beam-forming network, where the virtual antenna ports are connected to the second beam-forming network.

According to another example, physical distances are mutually equal and the virtual distances are mutually equal.

According to another example, the first beam-forming network is arranged to transform said physical antenna ports to said virtual antenna ports with virtual distances that are adapted in dependence of a desired total half-power sector beamwidth of a sector at the node.

According to another example, the virtual antennas have equal antenna radiation properties and equal phase properties with respect to the virtual antenna ports.

More examples are disclosed in the dependent claims.

A number of advantages are obtained by means of the present invention. For example:

Antenna port phase centers can be controlled in software, not being fixed by design, which can be used to change the antenna port phase center separation.

Improved gain.

Higher directivity due to narrower beams.

Reduced interference.

Precoder beams narrower, pointing inside the present sector instead of outside.

BRIEF DESCRIPTION OF THE DRAWINGS

The present invention will now be described more in detail with reference to the appended drawings, where.

DETAILED DESCRIPTION

Figure 1:
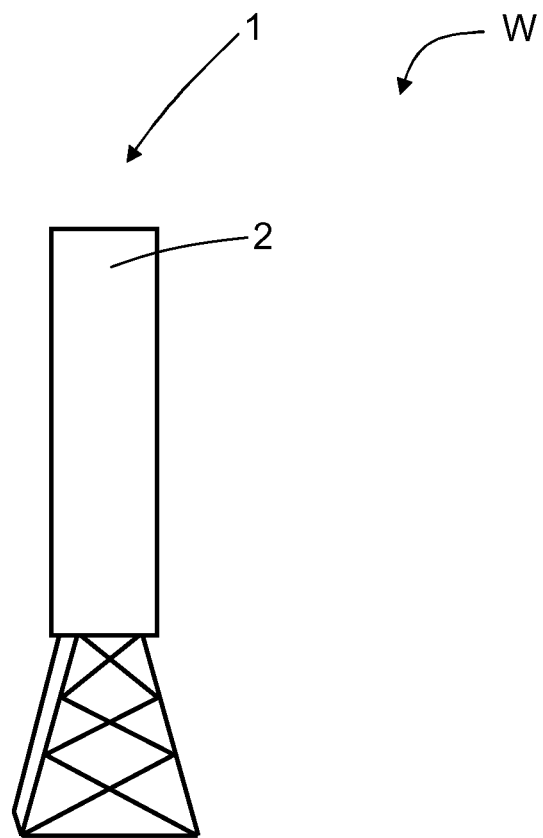
FIG. 1 shows a schematical view of a node in a wireless communication system.
Figure 3:
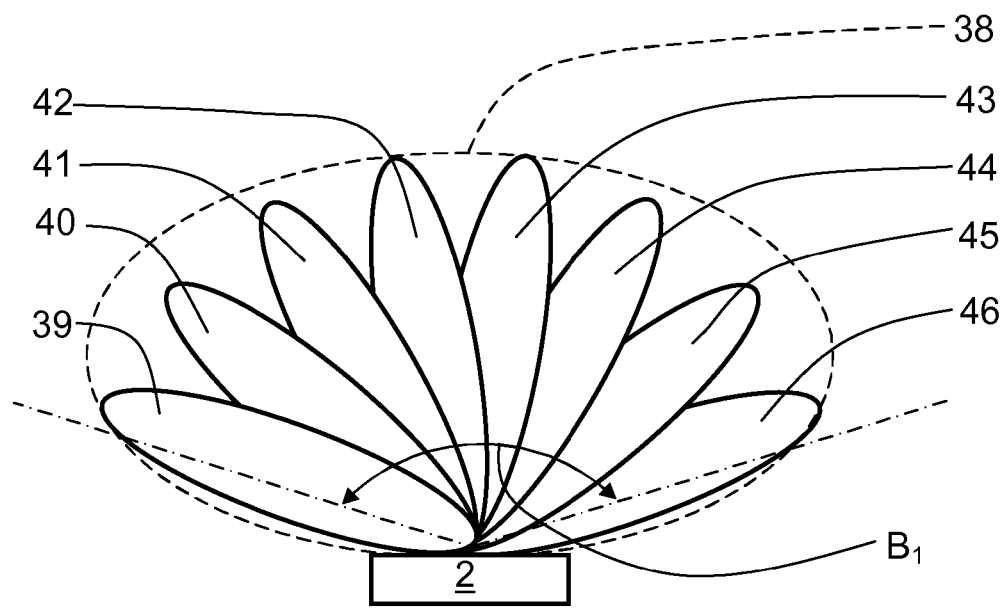
FIG. 3 shows a schematical example of a first sector width.
Figure 4:
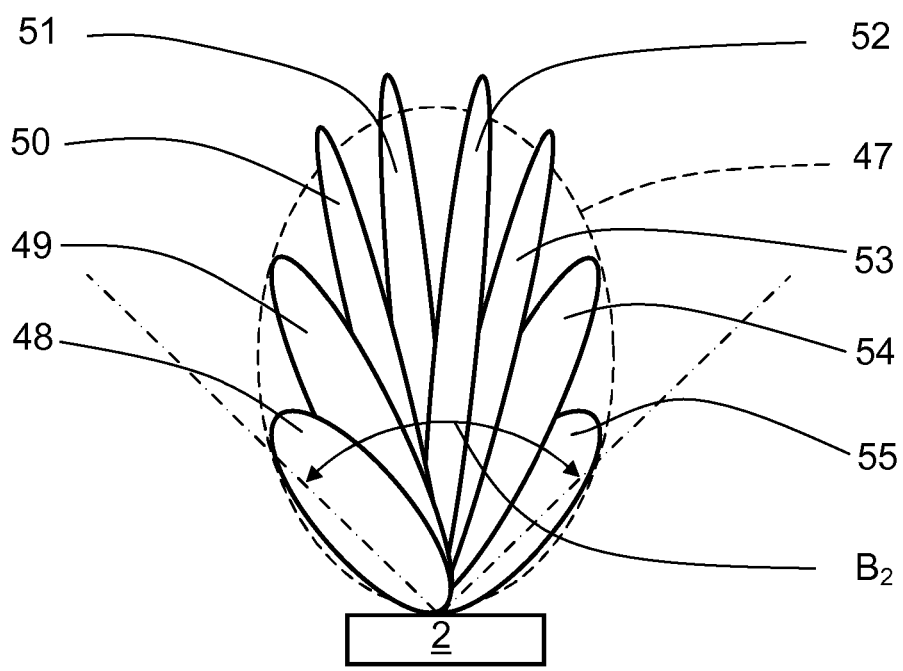
FIG. 4 shows a schematical example of a second sector width.

With reference to FIG. 1, there is a node 1 in a wireless communication arrangement W the node comprising an antenna arrangement 2, where the antenna arrangement 2 is adapted to cover a certain sector in an azimuth plane which lies perpendicular to the plane of the paper in FIG. 1. Examples of sectors are shown in FIG. 3 and FIG. 4, which will bed described later.

Figure 2:
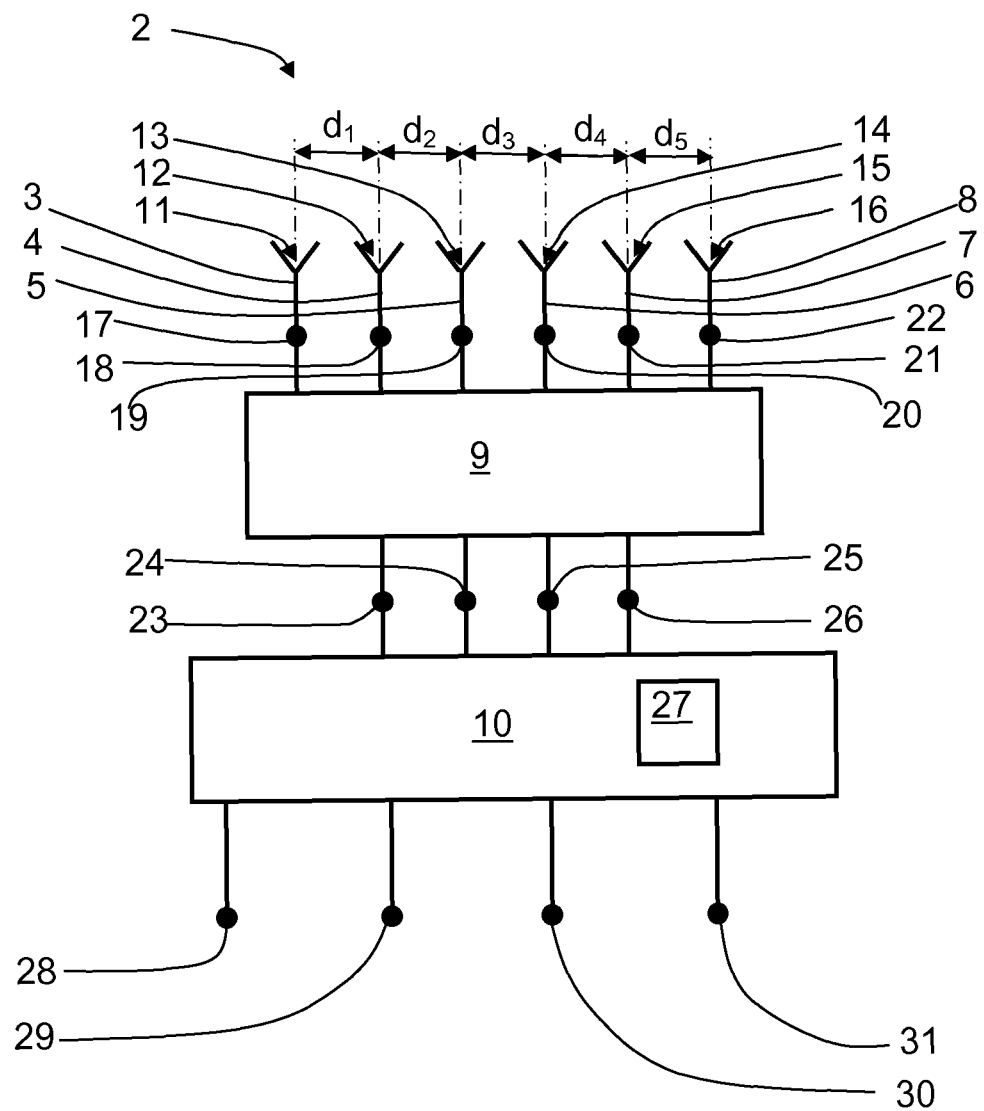
FIG. 2 shows a schematical view of an antenna arrangement according to the present invention.

With reference to FIG. 2, the antenna arrangement 2 comprises a first physical antenna element 3, a second physical antenna element 4, a third physical antenna element 5, a fourth physical antenna element 6, a fifth physical antenna element 7 and a sixth physical antenna element 8. Each physical antenna element 3, 4, 5, 6, 7, 8 has a corresponding first physical phase center 11, second physical phase center 12, third physical phase center 13, fourth physical phase center 14, fifth physical phase center 15 and sixth physical phase center 16.

Between the first physical phase center 11 and the second physical phase center 12 there is a first physical distance $d_1$; between the second physical phase center 12 and the third physical phase center 13 there is a second physical distance $d_2$; between the third physical phase center 13 and the fourth physical phase center 14 there is a third physical distance $d_3$; between the fourth physical phase center 14 and the fifth physical phase center 15 there is a fourth physical distance $d_4$; and between the fifth physical phase center 15 and the sixth physical phase center 16 there is a fifth physical distance $d_5$.

Each physical antenna element 3, 4, 5, 6, 7, 8 has a corresponding first physical antenna port 17, second physical antenna port 18, third physical antenna port 19, fourth physical antenna port 20, fifth physical antenna port 21 and sixth physical antenna port 22. The physical antenna ports 17, 18, 19, 20, 21, 22 are connected to a first beam-forming network 9.

According to the present invention, the first beam-forming network 9 is arranged to transform said physical antenna ports 17, 18, 19, 20, 21, 22 to a first virtual antenna port 23, a second virtual antenna port 24, a third virtual antenna port 25, and a fourth virtual antenna port 26. The virtual antenna ports 23, 24, 25, 26 corresponding to virtual antenna elements, each virtual antenna element having a certain virtual phase center where the virtual phase centers are separated by corresponding virtual distances.

The virtual antennas have equal antenna radiation properties and equal phase properties with respect to the virtual antenna ports 23, 24, 25, 26.

The physical distances $d_1$, $d_2$, $d_3$, $d_4$, $d_5$ differ from the virtual distances, but in this example the physical distances $d_1$, $d_2$, $d_3$, $d_4$, $d_5$ are mutually equal and that the virtual distances are mutually equal.

The virtual antenna ports 23, 24, 25, 26 are in turn connected to a second beam-forming network 10 that comprises a precoder 27 and a first beam port 28, a second beam port 29, a third beam port 30 and a fourth beam port 31. The precoder 27 is arranged to apply one of a plurality of predetermined sets of weights to the virtual antenna ports 23, 24, 25, 26 such that the beamformed virtual antenna ports are provided at said beam ports 28, 29, 30, 31.

The change of distances between the physical phase centers and the virtual phase centers is thus accomplished by applying a first weight matrix to the physical antenna ports 17, 18, 19, 20, 21, 22 by means of the first beam-forming network 9; an operation that may be referred to as virtual port beamforming. User-specific beams are then created by applying a second weight matrix, comprising one predetermined set of weights from a plurality of predetermined sets of weights, for example a matrix in the LTE (Long Term Evolution) codebook, to the virtual antenna ports by means of the second beam-forming network 10.

A purpose of the virtual port beamforming is to create a radiating pattern of the virtual antenna ports 23, 24, 25, 26 that gives a desired sector shape. The amplitude and phase of these patterns should be the same for all virtual antenna ports 23, 24, 25, 26, except for the phase difference caused by different phase centers of the virtual antenna ports 23, 24, 25, 26. The virtual antenna ports are created with virtual phase centers that enables the codebook beams to get the desired pointing directions.

With reference to FIG. 3, showing a top view of the antenna arrangement 2, a first sector 38 is used, having a first total half-power sector beamwidth $B_1$. A first plurality of user-specific beams 39, 40, 41, 42, 43, 44, 45, 46 are provided at the beam ports 28, 29, 30, 31, and radiate within the first total half-power sector beamwidth $B_1$.

With reference also to FIG. 4, showing a corresponding view, when a change of sector width is desired, from the first sector 38 to a second sector 47 having a second total half-power sector beamwidth $B_2$, a second plurality of user-specific beams 48, 49, 50, 51, 52, 53, 54, 55 are provided at the beam ports 28, 29, 30, 31. The second plurality of user-specific beams 48, 49, 50, 51, 52, 53, 54, 55 radiate within the second total half-power sector beamwidth $B_2$, where the second total half-power sector beamwidth $B_2$ falls below the first total half-power sector beamwidth $B_1$.

Each one of the beams in the second plurality of user-specific beams 48, 49, 50, 51, 52, 53, 54, 55 has a narrower beamwidth than each one of the beams in the first plurality of user-specific beams 39, 40, 41, 42, 43, 44, 45, 46 in order to fit all beams of the second plurality of user-specific beams 48, 49, 50, 51, 52, 53, 54, 55 in the second sector 47. This is made possible by means of changing the distances between the virtual phase centers accordingly by means of the first beam-forming network 9.

Beamwidth and phase center spacing of virtual antenna ports are thus adjusted independently of each other, and this is used for adapting the user-specific codebook beams so that they match the current sector width when a sector is reconfigured. The pointing directions and beamwidth of the user-specific beams 39, 40, 41, 42, 43, 44, 45, 46; 48, 49, 50, 51, 52, 53, 54, 55 can be controlled without having to change the weights in the codebook, such that no standard changes are required, the orthogonality properties of the LTE codebook not being affected.

The purpose with the precoding is to utilize the spatial filtering provided by the antenna array together with the codebook. The beamwidth of the user-specific beams 39, 40, 41, 42, 43, 44, 45, 46; 48, 49, 50, 51, 52, 53, 54, 55, HPBW, is inversely proportional to the number of virtual antenna ports 23, 24, 25, 26, N, multiplied by a virtual distance $d_r$ between adjacent virtual phase centers, where the virtual distance here is assumed equal for all virtual phase centers.

For single-polarized arrays, the number of orthogonal user-specific beams is given by the number N of virtual antenna ports. The objective is to make N×HPBW approximately the same as, or somewhat less than, the total half-power sector beamwidth $B_1$, $B_2$ such that the user-specific beams 39, 40, 41, 42, 43, 44, 45, 46; 48, 49, 50, 51, 52, 53, 54, 55 fit within the sector 38, 47.

As described initially for prior art, if N×HPBW is greater than the total half-power sector beamwidth $B_1$, $B_2$, some user-specific beams will not be utilized since they fall outside the sector. This means that the antenna gain is not as high as it could be and the spatial filtering is not fully utilized. By means of the present invention, this problem is avoided by adapting the pointing directions of each user-specific beam 39, 40, 41, 42, 43, 44, 45, 46; 48, 49, 50, 51, 52, 53, 54, 55 defined by the codebook so that they always point inside the sector 38, 47.

Generally, the resulting phase center of a linear combination of antenna elements is essentially determined by the center-of-gravity of this combination. This center-of-gravity can be moved by changing the weights of the first weight matrix. By using different weights for different virtual antenna ports, the phase centers of these ports can be controlled.

As an example of a design procedure for virtual port beamforming, the following steps may be taken:
1. Determine a desired beam shape of the virtual antenna ports, e.g. beam width based on a desired sector width.
2. Determine a virtual antenna port separation so that user-specific beams obtain desired pointing directions.
3. Calculate a first weight matrix that achieves the objectives in the steps 1-2.

The first weight matrix can for example be calculated using an optimization procedure that yields desired beam patterns and phase centers of the virtual antenna ports. Such an optimization procedure may comprise multi-objective optimization of two cost functions; one for the amplitude pattern and one for the phase response. The cost function related to the amplitude pattern of the k-th virtual antenna port is given by the variance of the gain difference in dB between the desired gain pattern and the synthesized pattern calculated within an angular sector related to the sector width.

The cost function related to the phase response of the k-th virtual antenna port is given by the second moment of $\angle G_s G^*_d$, where $G_s$ is the synthesized pattern and $G_d$ is the desired pattern. This is calculated within the same angular sector as the gain cost function. For each virtual antenna port the Pareto frontier of these two cost functions are calculated. The solution is obtained by picking a suitable point on this Pareto frontier.

The optimization calculation of the virtual port beamforming weights may be performed on-line in a base station since the changes in sector width is foreseen to be performed at a slow time scale, for example in the order of hours or days. As another alternative, suitable weights of the first weight matrix could be pre-calculated for different sector widths and stored in a table for later look-up by the node.

Figure 5:
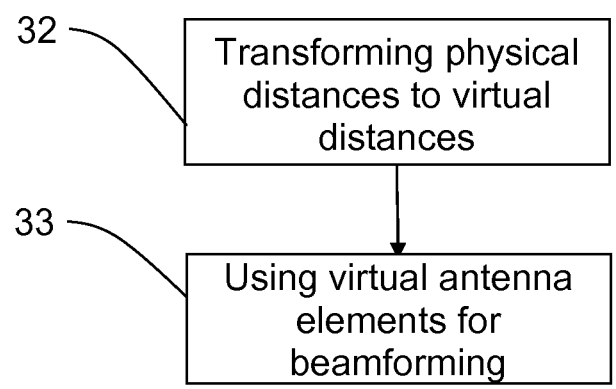
FIG. 5 shows a flowchart of a method according to the present invention.

With reference to FIG. 5, the present invention also relates to a method for enhancing efficiency of antenna beams at a node 1 in a wireless communication system W. The method comprises the steps of:

32: transforming physical distances $d_1$, $d_2$, $d_3$, $d_4$, $d_5$ between physical phase centers 11, 12, 13, 14, 15, 16 of physical antenna elements 3, 4, 5, 6, 7, 8 to virtual distances between virtual phase centers of virtual antenna elements; and

33: using the virtual antenna elements, with said virtual distances between their corresponding virtual phase centers, for beamforming.

The present invention is not limited to the examples above, but may vary freely within the scope of the appended claims. For example the node may comprise several antenna arrangements, each antenna arrangement being arranged to cover a certain sector. The sector or sectors do not have to lie in an azimuth plane, by may lie in any suitable plane, such as for example an elevation plane.

Each antenna arrangement 2 comprises at least three physical antenna elements 3, 4, 5, 6, 7, 8, and the first beam-forming network 9 is arranged to transform said physical antenna ports 17, 18, 19, 20, 21, 22 to at least two virtual antenna ports. Any suitable number above these is conceivable, for example six physical antenna elements 3, 4, 5, 6, 7, 8 and four virtual antenna ports 23, 24, 25, 26 as in the disclosed example.

The antenna elements of each antenna arrangement 2 may be in the form of a one-dimensional array antenna or in the form of a two-dimensional array antenna. Each physical antenna element may in turn be constituted by several sub-elements or even sub-arrays.

The method could also be used to either increase and/or decrease the virtual antenna port separation.

Another application of the method is to adaptively adjust the virtual antenna port separation to change the correlation between virtual antenna port signals. For example, increasing the distance between the virtual antenna ports decreases the correlation, which increases the spatial multiplexing and diversity gains.

The virtual antennas have equal antenna radiation properties and equal phase properties with respect to the virtual antenna ports 23, 24, 25, 26. However, the term equal does in this context not mean mathematically equal, but equal within what is practically obtainable. For example, the phase properties may be regarded as practically equal, although there is a discrepancy due to the the phase difference caused by different phase centers of the virtual antenna ports 23, 24, 25, 26.

Generally, the number of beam ports should preferably be equal to, or less than, the number of virtual antenna ports. The number of beam ports is normally not constant, but varies over time in dependence of the rank at which the transmission is made. This may vary over time, and may be different for different users, but there should be at least one beam port. Normally, a system is configured for a certain number of virtual antenna ports which enable a number of beam ports, the number being limited by the number of virtual antenna ports. A system may of course be re-configured such that the number of virtual antenna ports is changed, if needed.

In the examples described, the number of user specific beams being available at a certain moment equals the number of beam ports, which means that not all user specific beams shown in FIG. 3 and FIG. 4 are available at the same time in the example. The user specific beams 39, 40, 41, 42, 43, 44, 45, 46; 48, 49, 50, 51, 52, 53, 54, 55 shown in FIG. 3 and FIG. 4 thus represent all beams that are available in the codebook. This is of course only an example, there may for example be many more beams that are available in the codebook.

Beam ports of this type are normally created in software by means of matrix multiplication, using a codebook matrix, which in turn is determined by an estimation of the present channel in a previously known manner.

When dual polarized antennas are used in the antenna arrangement, the present invention is applied for each polarization separately. Each physical antenna element is thus arranged to receive and/or transmit in a certain polarization.

This means that, as a further example, said physical antenna elements 3, 4, 5, 6, 7, 8 may be arranged to receive and/or transmit in a first polarization. The antenna arrangement 2 further comprises at least three further physical antenna elements, each further physical antenna element being arranged to receive and/or transmit in a second polarization, separate from the first polarization. Each set of physical antenna elements of a certain polarization are connected such that a corresponding set of virtual antenna ports is obtained as described above, the present invention being applied for each polarization separately.

The invention claimed is:

1. A node in a wireless communication system comprising an antenna arrangement, wherein the antenna arrangement in turn comprises at least three physical antenna elements and a first beam-forming network, each physical antenna element having a corresponding physical phase center and corresponding physical antenna port, wherein the physical phase centers are separated by corresponding physical distances and the physical antenna ports are connected to the first beam-forming network, wherein the first beam-forming network is arranged to transform said physical antenna ports to at least two virtual antenna ports, which virtual antenna ports correspond to virtual antenna elements, each virtual antenna element having a certain virtual phase center wherein the virtual phase centers are separated by corresponding virtual distances, wherein the physical distances differ from the virtual distances.

2. The node according to claim 1, wherein the antenna arrangement comprises a second beam-forming network, said virtual antenna ports being connected to the second beam-forming network.

3. The node according to claim 1, wherein the physical distances are mutually equal and the virtual distances are mutually equal.

4. The node according to claim 2, wherein the second beam-forming network comprises a precoder and at least one beam port, wherein the precoder is arranged to apply one of a plurality of predetermined sets of weights to the virtual antenna ports such that beamformed virtual antenna ports are provided at said beam ports.

5. The node according to claim 4, wherein the plurality of predetermined sets of weights are comprised in an LTE, Long Term Evolution, codebook.

6. The node according to claim 1, wherein the first beam-forming network is arranged to transform said physical antenna ports to said virtual antenna ports with virtual distances that are adapted in dependence of a desired total half-power sector beamwidth of a sector at the node.

7. The node according to claim 1, wherein the virtual antennas have equal antenna radiation properties and equal phase properties with respect to the virtual antenna ports.

8. The node according to claim 1, wherein said physical antenna elements are arranged to receive and/or transmit in a first polarization, wherein the antenna arrangement also comprises at least three further physical antenna elements, each further physical antenna element being arranged to receive and/or transmit in a second polarization, separate from the first polarization, each set of physical antenna elements of a certain polarization corresponding to a certain set of virtual antenna ports.

9. A method for enhancing efficiency of antenna beams at a node in a wireless communication system comprising:
transforming, by a first beam-forming network, physical distances between physical phase centers of physical antenna elements to virtual distances between virtual phase centers of virtual antenna elements; and
using the virtual antenna elements, with said virtual distances between their corresponding virtual phase centers, for beamforming.

10. The method according to claim 9, wherein the physical distances are mutually equal and the virtual distances are mutually equal.

11. The method according to claim 9, wherein the virtual antennas have equal antenna radiation properties and equal phase properties with respect to the virtual antenna ports.

* * * * *